(12) United States Patent
Fujiya et al.

(10) Patent No.: US 11,519,736 B2
(45) Date of Patent: Dec. 6, 2022

(54) MEASUREMENT DEVICE, MEASUREMENT METHOD AND PROGRAM

(71) Applicant: PIONEER CORPORATION, Tokyo (JP)

(72) Inventors: Kazufumi Fujiya, Kawagoe (JP); Tomoaki Iwai, Kawagoe (JP); Masahiro Kato, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 300 days.

(21) Appl. No.: 16/615,083

(22) PCT Filed: May 17, 2018

(86) PCT No.: PCT/JP2018/019146
§ 371 (c)(1),
(2) Date: Nov. 19, 2019

(87) PCT Pub. No.: WO2018/212287
PCT Pub. Date: Nov. 22, 2018

(65) Prior Publication Data
US 2020/0103234 A1  Apr. 2, 2020

(30) Foreign Application Priority Data

May 19, 2017 (JP) .............................. JP2017-100183

(51) Int. Cl.
*G01C 21/28* (2006.01)
*G01S 17/89* (2020.01)
(Continued)

(52) U.S. Cl.
CPC .............. *G01C 21/28* (2013.01); *G01S 17/89* (2013.01); *G01S 17/93* (2013.01); *G08G 1/16* (2013.01)

(58) Field of Classification Search
CPC ................ G01C 21/28; G01C 21/3804; G01C 21/3602; G01S 17/89; G01S 17/93;
(Continued)

(56) References Cited

U.S. PATENT DOCUMENTS

2011/0044507 A1    2/2011  Strauss et al.
2017/0043773 A1*   2/2017  Watanabe ............ G06K 9/6262
(Continued)

FOREIGN PATENT DOCUMENTS

CN    101952688 A  *  1/2011  ............. G01C 21/30
DE    102007034196 A1 * 1/2009  ............. B60W 30/12
(Continued)

OTHER PUBLICATIONS

Machine Translation JP-6566132-B2 (year:2019).*
(Continued)

*Primary Examiner* — Aaron L Troost
*Assistant Examiner* — Connor L Knight
(74) *Attorney, Agent, or Firm* — Procopio, Cory, Hargreaves & Savitch LLP (57) ABSTRACT

The measurement device acquires positional information of a measurement object stored in a storage unit, and acquires point group information of points indicating a surrounding feature acquired by an external sensor. Then, the measurement device calculates the positional information indicating a predetermined position of the measurement object existing in a predetermined range based on the point group information existing in the predetermined range, and outputs its reliability.

9 Claims, 6 Drawing Sheets

(51) Int. Cl.
*G01S 17/93* (2020.01)
*G08G 1/16* (2006.01)

(58) Field of Classification Search
CPC ........ G01S 17/931; G08G 1/16; G08G 1/167;
G06K 9/00798; G06K 9/00791; G06K
9/00818; B60W 30/10; B60W 30/12;
B60W 2552/53; G06V 20/588
See application file for complete search history.

(56) References Cited

U.S. PATENT DOCUMENTS

| | | | | |
|---|---|---|---|---|
| 2018/0086342 | A1* | 3/2018 | Ohsugi | ............... B60W 30/10 |
| 2018/0273031 | A1* | 9/2018 | Fujita | ............... G01C 21/3667 |
| 2018/0328742 | A1* | 11/2018 | Asai | ............... G01C 21/14 |
| 2019/0063928 | A1 | 2/2019 | Hasberg et al. | |
| 2019/0095723 | A1* | 3/2019 | Tsuchiya | ............... G06K 9/6221 |

FOREIGN PATENT DOCUMENTS

| | | | |
|---|---|---|---|
| DE | 102015220695 A1 | 4/2017 | |
| JP | 2003196798 A * | 7/2003 | |
| JP | 2015222223 A | 12/2015 | |
| JP | 2017004176 A | 1/2017 | |
| JP | 2017037472 A | 2/2017 | |
| JP | 2017072422 A | 4/2017 | |
| JP | 2018092483 A * | 6/2018 | |
| JP | 6566132 B2 * | 9/2019 | ........... G08G 1/0125 |
| KR | 20100127343 A * | 12/2010 | |
| WO | WO-2018003406 A1 * | 1/2018 | ............... G06T 7/70 |

OTHER PUBLICATIONS

Machine Translation JP-2018092483-A (year:2018).*
Machine Translation DE-102007034196-A1 (year:2009).*
Machine Translation WO-2018003406-A1 (year:2018).*
Machine Translation: KR-20100127343-A (year:2010).*
Machine Translation: JP-2003196798-A (year:2003).*
Machine Translation: CN-101952688-A (year:2011).*
Extended European Search Report dated Feb. 1, 2021 in counterpart EP Patent Application No. 18802021.8, 11 pages.
International Search Report for related International Application No. PCT/JP2018/019146, dated Jul. 17, 2018 English translation provided (2 pages).

* cited by examiner

MEASUREMENT DEVICE, MEASUREMENT METHOD AND PROGRAM

TECHNICAL FIELD

The present invention relates to a technique of estimating a position of a movable body based on positions of features.

BACKGROUND TECHNIQUE

In an automatic driving vehicle, it is necessary to match feature positions measured by a sensor such as a LiDAR (Light Detection and Ranging) and feature positions in map information for automatic driving to precisely estimate an own vehicle position. Examples of the features used here include white lines, road signs and signboards. Patent Reference 1 discloses an example of a method of estimating an own vehicle position by using the feature positions detected by a LiDAR and the feature positions in map information. Patent Reference 2 discloses a technique of transmitting an electromagnetic wave to a road surface and detecting white lines based on its reflectivity.

PRIOR ART REFERENCES

Patent References

Patent Reference 1: Japanese Patent Application Laid-Open under No. 2017-72422
Patent Reference 2: Japanese Patent Application Laid-Open under No. 2015-222223

SUMMARY OF THE INVENTION

Problem to be Solved by the Invention

When an own vehicle position is estimated using white lines, an amount of data measured by a LiDAR becomes different dependently upon kinds (e.g., continuous line or broken line) of the white lines and deterioration of painting. Therefore, when an own vehicle position is estimated using white lines, detection accuracy of the white lines is changed between the cases in which the amount of LiDAR data used for detecting the while lines is small and large. As a result, accuracy of estimating an own vehicle position is changed.

The above is an example of the problem to be solved by the present invention. It is an object of the present invention to prevent deterioration of accuracy in estimating an own vehicle position by utilizing reliability of the white lines extracted as features.

Means for Solving the Problem

An invention described in claims is a measurement device comprising: a first acquisition unit configured to acquire positional information of a measurement object stored in a storage unit; a second acquisition unit configured to acquire point group information of points indicating a surrounding feature acquired by an external sensor; and an output unit configured to output reliability of the positional information indicating a predetermined position of the measurement object existing in a predetermined range based on the point group information existing in the predetermined range.

Another invention described in claims is a measurement method executed by a measurement device, comprising: a first acquisition process configured to acquire positional information of a measurement object stored in a storage unit; a second acquisition process configured to acquire point group information of points indicating a surrounding feature acquired by an external sensor; and an output process configured to output reliability of the positional information indicating a predetermined position of the measurement object existing in a predetermined range based on the point group information existing in the predetermined range.

Still another invention described in claims is a program executed by a measurement device including a computer, the program causing the computer to function as: a first acquisition unit configured to acquire positional information of a measurement object stored in a storage unit; a second acquisition unit configured to acquire point group information of points indicating a surrounding feature acquired by an external sensor; and an output unit configured to output reliability of the positional information indicating a predetermined position of the measurement object existing in a predetermined range based on the point group information existing in the predetermined range.

DETAILED DESCRIPTION OF THE PREFERRED EMBODIMENTS

According to one aspect of the present invention, there is provided a measurement device comprising: a first acquisition unit configured to acquire positional information of a measurement object stored in a storage unit; a second acquisition unit configured to acquire point group information of points indicating a surrounding feature acquired by an external sensor; and an output unit configured to output reliability of the positional information indicating a predetermined position of the measurement object existing in a predetermined range based on the point group information existing in the predetermined range.

The above measurement device acquires positional information of a measurement object stored in a storage unit, and acquires point group information of points indicating a surrounding feature acquired by an external sensor. Then, the measurement device calculates the positional information indicating a predetermined position of the measurement object existing in a predetermined range based on the point group information existing in the predetermined range, and outputs its reliability. Thus, a use method of the positional information may be changed in consideration of the reliability, and it is possible to prevent the deterioration of the accuracy caused by the use of the positional information of low reliability. In a preferred example, the measurement object may be lane dividing lines such as white lines or yellow lines painted on a road, or linear road signs such as pedestrian crossings and stop lines.

In one mode of the above measurement device, the output unit sets the reliability higher as a number of the points or a number of sets of the points existing in the predetermined range is larger. In this mode, the reliability may be set based on the number of the points existing in the predetermined range.

In another mode of the above measurement device, the measurement object is a road surface line, and the output unit calculates an ideal number of points, which is a number of the points on an ideal road surface line, based on a width information of the road surface line, and determines the reliability based on a ratio of the number of the points existing in the predetermined range to the ideal number of the points. In this mode, the reliability is set based on the number of the points actually measured in the predetermined range and the ideal number of the points. In a preferred example in this mode, the output unit sets the reliability higher as the ratio of the number of the points existing in the predetermined range to the ideal number of the points is larger. In this specification, "road surface lines" include lane dividing lines such as white lines or yellow lines to be measured, and linear road signs such as pedestrian crossings and stop lines.

Another mode of the above measurement device further comprises a range determination unit configured to calculate a predicted position of the measurement object based on the positional information of the measurement object and the position of the measurement device, and determine the predetermined range based on the predicted position. In this mode, the predetermined range is determined based on the predicted position of the measurement object.

In another mode of the above measurement device, the output unit outputs the positional information indicating the predetermined position of the measurement object. In this mode, the positional information of the measurement object and its reliability are outputted.

According to another aspect of the present invention, there is provided a measurement method executed by a measurement device, comprising: a first acquisition process configured to acquire positional information of a measurement object stored in a storage unit; a second acquisition process configured to acquire point group information of points indicating a surrounding feature acquired by an external sensor; and an output process configured to output reliability of the positional information indicating a predetermined position of the measurement object existing in a predetermined range based on the point group information existing in the predetermined range. Thus, a use method of the positional information may be changed in consideration of the reliability, and it is possible to prevent the deterioration of the accuracy caused by the use of the positional information of low reliability.

According to still another aspect of the present invention, there is provided a program executed by a measurement device including a computer, the program causing the computer to function as: a first acquisition unit configured to acquire positional information of a measurement object stored in a storage unit; a second acquisition unit configured to acquire point group information of points indicating a surrounding feature acquired by an external sensor; and an output unit configured to output reliability of the positional information indicating a predetermined position of the measurement object existing in a predetermined range based on the point group information existing in the predetermined range. By executing the program by a computer, the above measurement device may be realized. This program may be handled in a manner stored in a storage medium.

Embodiments

A preferred embodiment of the present invention will be described below with reference to the attached drawings.

White Line Extraction Method

Figure 1:
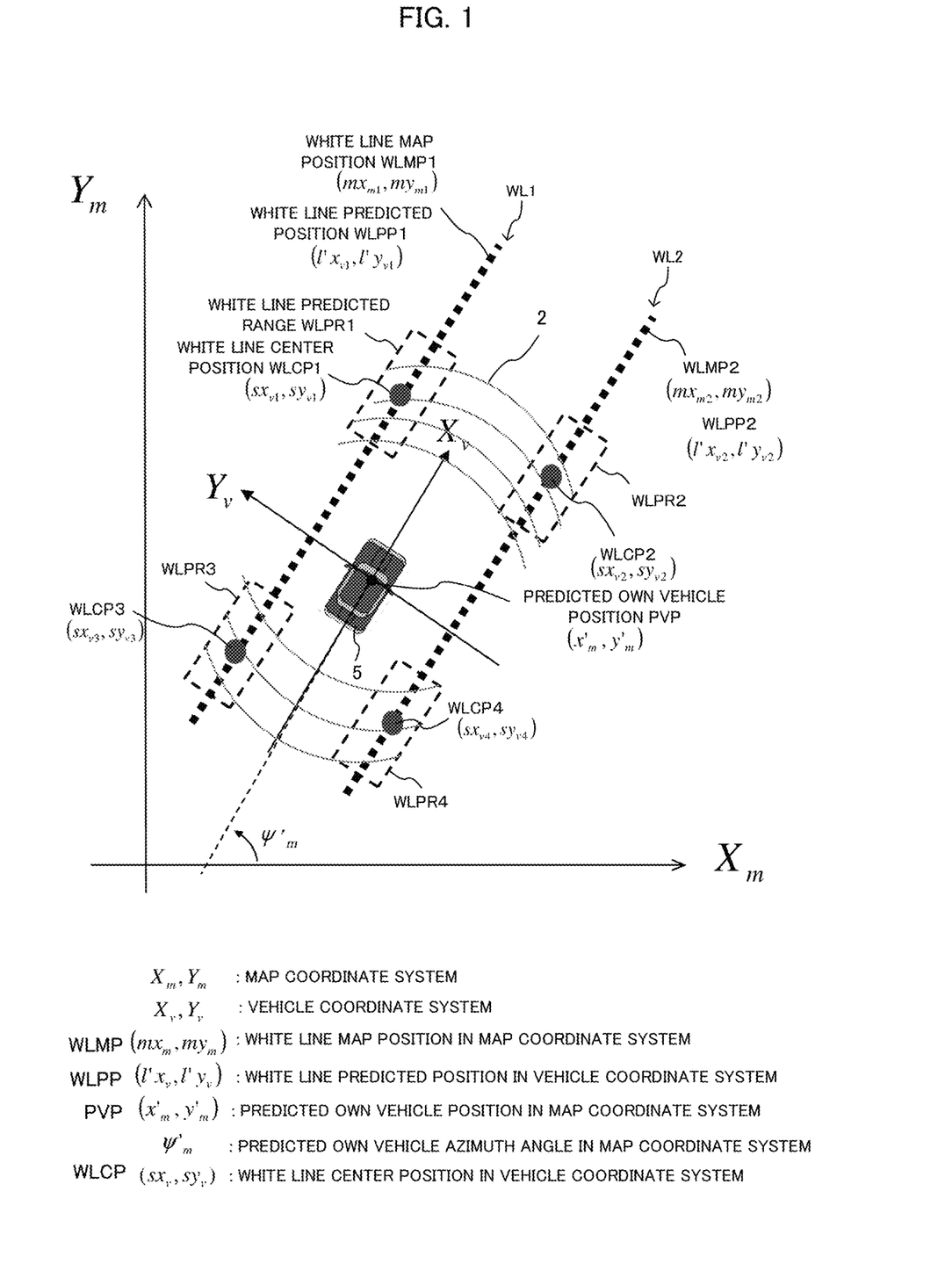
FIG. 1 is a diagram explaining a white line extraction method.

FIG. 1 is a diagram explaining a white line extraction method. "White line extraction" is to detect a white line painted on a road surface and calculate its predetermined position, e.g., a center position.

Calculation of White Line Predicted Position

As illustrated, a vehicle 5 exists on a map coordinate system $(X_m, Y_m)$, and a vehicle coordinate system $(X_v, Y_v)$ is defined based on the position of the vehicle 5. Specifically, the traveling direction of the vehicle 5 is defined as $X_v$-axis of the vehicle coordinate system, and its perpendicular direction is defined as $Y_v$-axis of the vehicle coordinate system.

On the left and right sides of the vehicle 5, there are white lines serving as lane boundaries. The positions of the white lines on the map coordinate system, i.e., the white line map positions are included in high-density map managed by a server, and are acquired from the server. In this embodiment, the data of the white line is stored in the high-density map as coordinate point sequence. The LiDAR loaded on the vehicle 5 measures scan data along the scan lines 2. The scan lines 2 indicate loci of the scan by the LiDAR.

In FIG. 1, it is supposed that the coordinates of the points forming the white line WL1 on the left side of the vehicle 5, i.e., the white line map positions WLMP1 are $(mx_{m1}, my_{m1})$, and that the coordinates of the points forming the white line WL2 on the right side of the vehicle 5, i.e., the white line map positions WLMP2 are $(mx_{m2}, my_{m2})$. The predicted own vehicle position PVP on the map coordinate system is given as $(x'_m, y'_m)$, and the predicted own vehicle azimuth angle is given as $\psi'_m$.

Here, the white line predicted positions WLPP $(l'x_v, l'y_v)$ indicating predicted positions of the white lines are given by the following equation (1) using the white line map position WLMP $(mx_m, my_m)$, the predicted own vehicle position PVP $(x'_m, y'_m)$ and the predicted own vehicle azimuth angle $\psi'_m$.

$$\begin{bmatrix} l'x_v \\ l'y_v \end{bmatrix} = \begin{bmatrix} \cos\psi'_m & \sin\psi'_m \\ -\sin\psi'_m & \cos\psi'_m \end{bmatrix} \begin{bmatrix} mx_m - x'_m \\ my_m - y'_m \end{bmatrix} \quad (1)$$

Therefore, by the equation (1), the white line predicted positions WLPP1 $(l'x_{v1}, l'y_{v1})$ are calculated for the white line WL1, and the white line predicted positions WLPP2 $(l'x_{v2}, l'y_{v2})$ are calculated for the white line WL2. Thus, for each of the white lines WL1 and WL2, plural white line predicted positions WLPP1 and WLPP2 are obtained.

Determination of White Line Predicted Range

Next, based on the white line predicted positions WLPP, white line predicted ranges WLPR are determined. The white line predicted range WLPR indicates a range in which the white line is supposed to exist, based on the predicted own vehicle position PVP. The white line predicted ranges WLPR are set at four positons at most, i.e., at the right-front position, the right-rear position, the left-front position and the left-rear position of the vehicle 5.

Figure 2A:
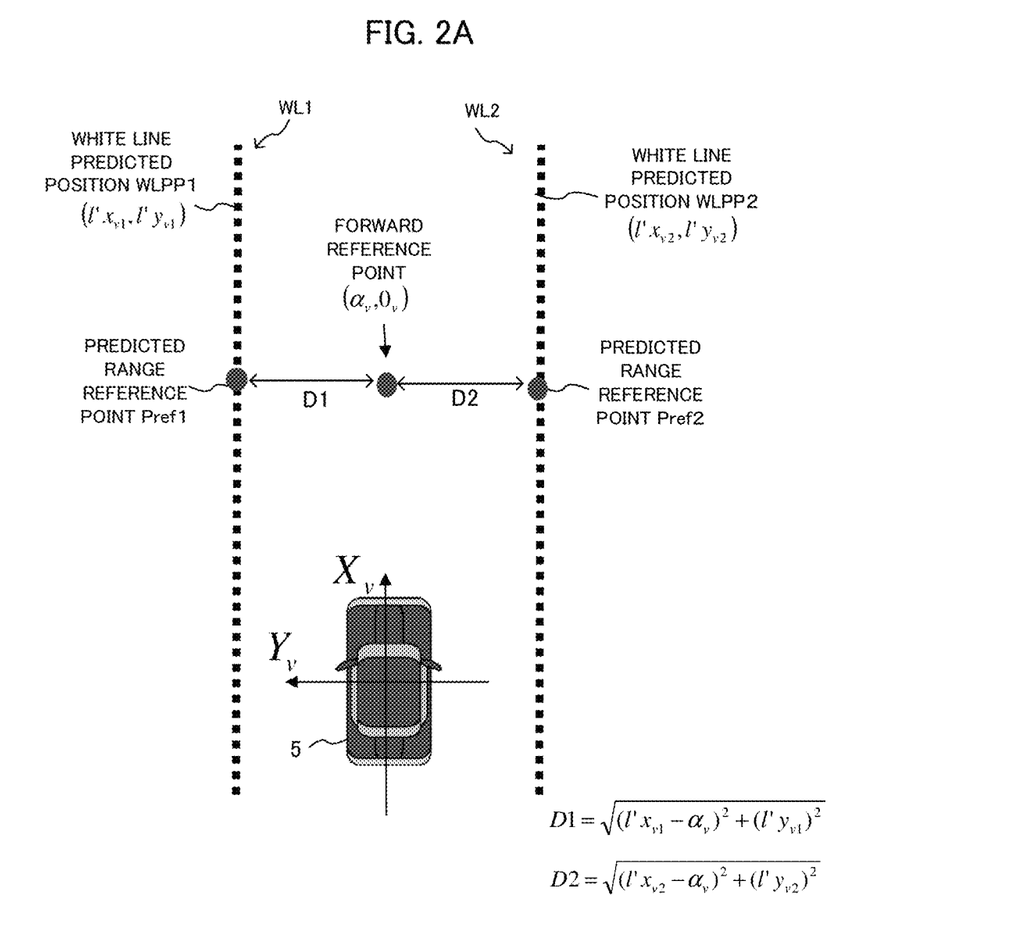
FIGS. 2A and 2B are diagrams explaining a determination method of white line predicted range.

FIGS. 2A and 2B illustrate a determination method of the white line predicted range WLPR. In FIG. 2A, a forward reference point ($\alpha_v$, $0_v$) is set at an arbitrary position (at the position of the distance $\alpha_v$) ahead of the vehicle 5. Then, based on the forward reference point ($\alpha_v$, $0_v$) and the white line predicted positions WLPP, the white line predicted position WLPP nearest from the forward reference point ($\alpha_v$, $0_v$) is searched. Specifically, as to the white line WL1, a distance D1 is calculated by the following equation (2) based on the forward reference point ($\alpha_v$, $0_v$) and plural white line predicted positions WLPP1 (l'$x_{v1}$, l'$y_{v1}$) forming the white line WL1, and the white line predicted position WLPP1 having the minimum distance D1 is determined as a predicted range reference point Pref1.

$$D1=\sqrt{(l'x_{v1}-\alpha_v)^2+(l'y_{v1})^2} \quad (2)$$

Similarly, as to the white line WL2, a distance D2 is calculated by the following equation (3) based on the forward reference point ($\alpha_v$, $0_v$) and plural white line predicted positions WLPP2 (l'$x_{v2}$, l'$y_{v2}$) forming the white line WL2, and the white line predicted position WLPP2 having the minimum distance D2 is determined as a predicted range reference point Pref2.

$$D2=\sqrt{(l'x_{v2}-\alpha_v)^2+(l'y_{v2})^2} \quad (3)$$

Figure 2B:
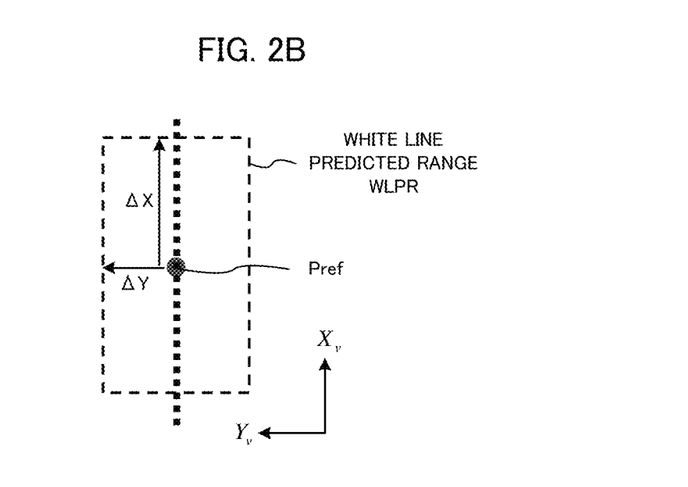

Then, as illustrated in FIG. 2B, an arbitrary range based on the predicted range reference point Pref, i.e., a range of $\pm\Delta X$ in the $X_v$-axis direction and $\pm\Delta Y$ in the $Y_v$-axis direction from the predicted range reference point Pref is set as the white line predicted range WLPR. Thus, as illustrated in FIG. 1, the white line predicted ranges WLPR1 and WLPR2 are set at the left and right positions ahead of the vehicle 5. Similarly, by setting a rear reference point behind the vehicle 5 to set the predicted range reference points Pref, the white line predicted ranges WLPR3 and WLPR4 are set at the left and right positions behind the vehicle 5. Thus, four white line predicted ranges WLPR1 to WLPR4 are set.

Calculation of White Line Center Position

Figure 3A:
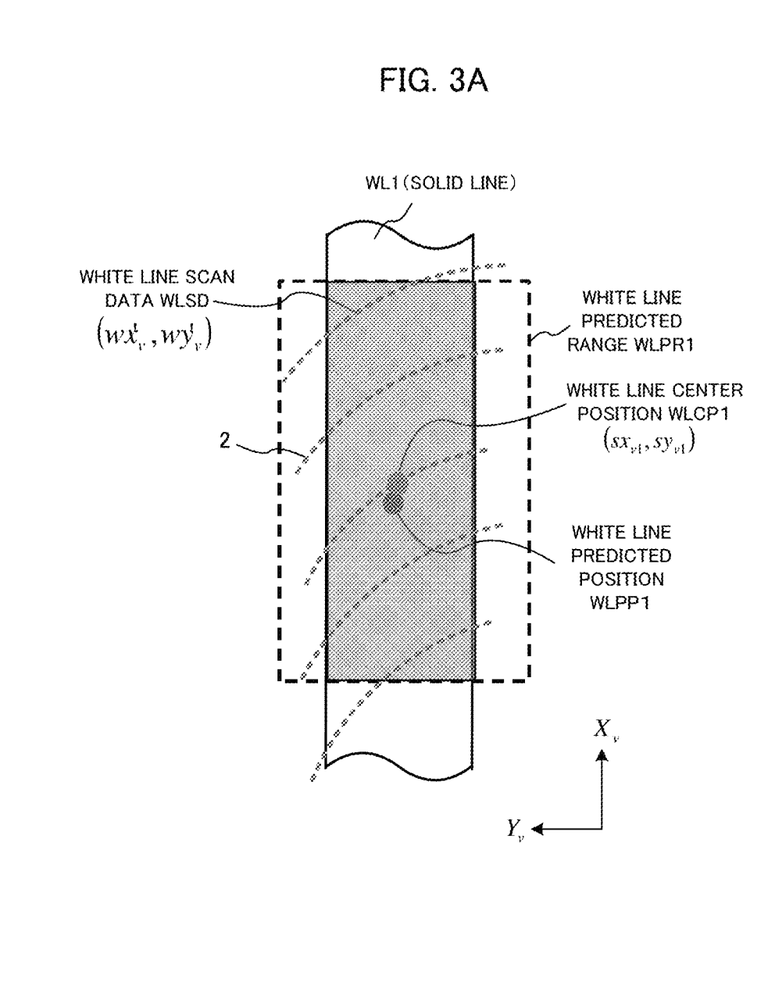
FIGS. 3A and 3B are diagrams explaining a calculation method of white line center position.
Figure 3B:
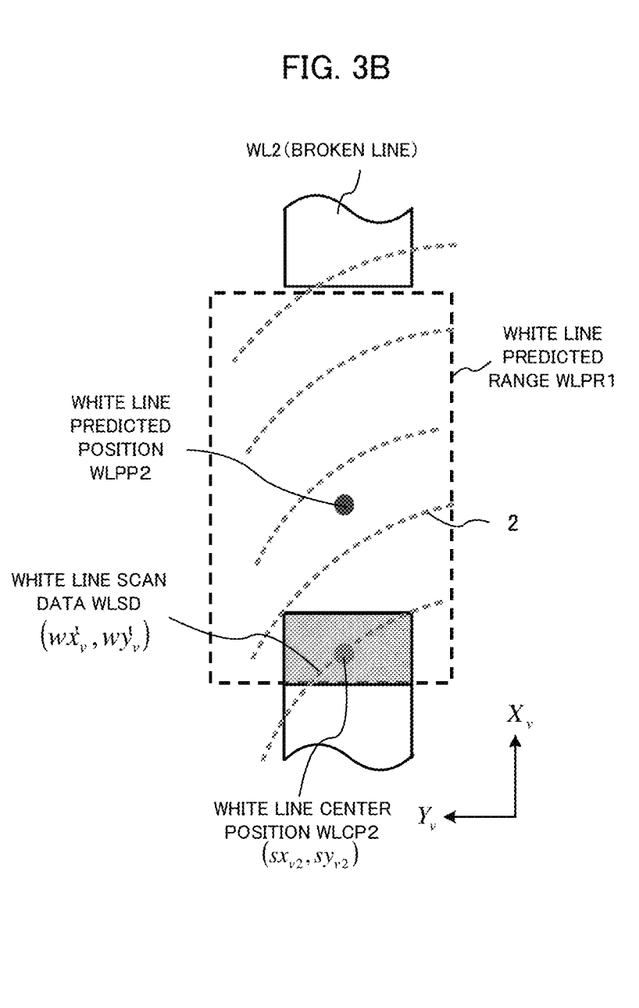

Next, a white line center position WLCP is calculated using the white line predicted positions WLPP. FIGS. 3A and 38 illustrate a calculation method of the white line center position WLCP. FIG. 3A illustrates the case where the white line WL1 is a solid line. The white line center position WLCP1 is calculated by an average value of the position coordinates of the scan data forming the white line. When the white line predicted range WLPR1 is set as shown in FIG. 3A, white line scan data WLSD1 (wx'$_v$, wy'$_v$) existing in the white line predicted range WLPR1 are extracted from the scan data outputted by the LiDAR. Since the reflectivity is higher on the white line than on a normal road, the scan data acquired on the white line have high reflectivity. Out of the scan data outputted by the LiDAR, the scan data existing in the white line predicted range WLPR1, existing on the road and having a reflection intensity higher than a predetermined value are extracted as the white line scan data WLSD. Supposing that the number of the extracted white line scan data WLSD is "n", the coordinates of the white line center position WLCP1 (sx$_{v1}$, sy$_{v1}$) is calculated by the following equation (4).

$$sx_v = \frac{1}{n}\sum_{k=1}^{n} wx_{vn} \quad (4)$$

$$sy_v = \frac{1}{n}\sum_{k=1}^{n} wy_{vn}$$

n: number of white line scan data

Also, as shown in FIG. 3B, the white line center position WLCP2 is calculated in the same manner when the white line is a broken line.

Calculation of Reliability

Figure 4:
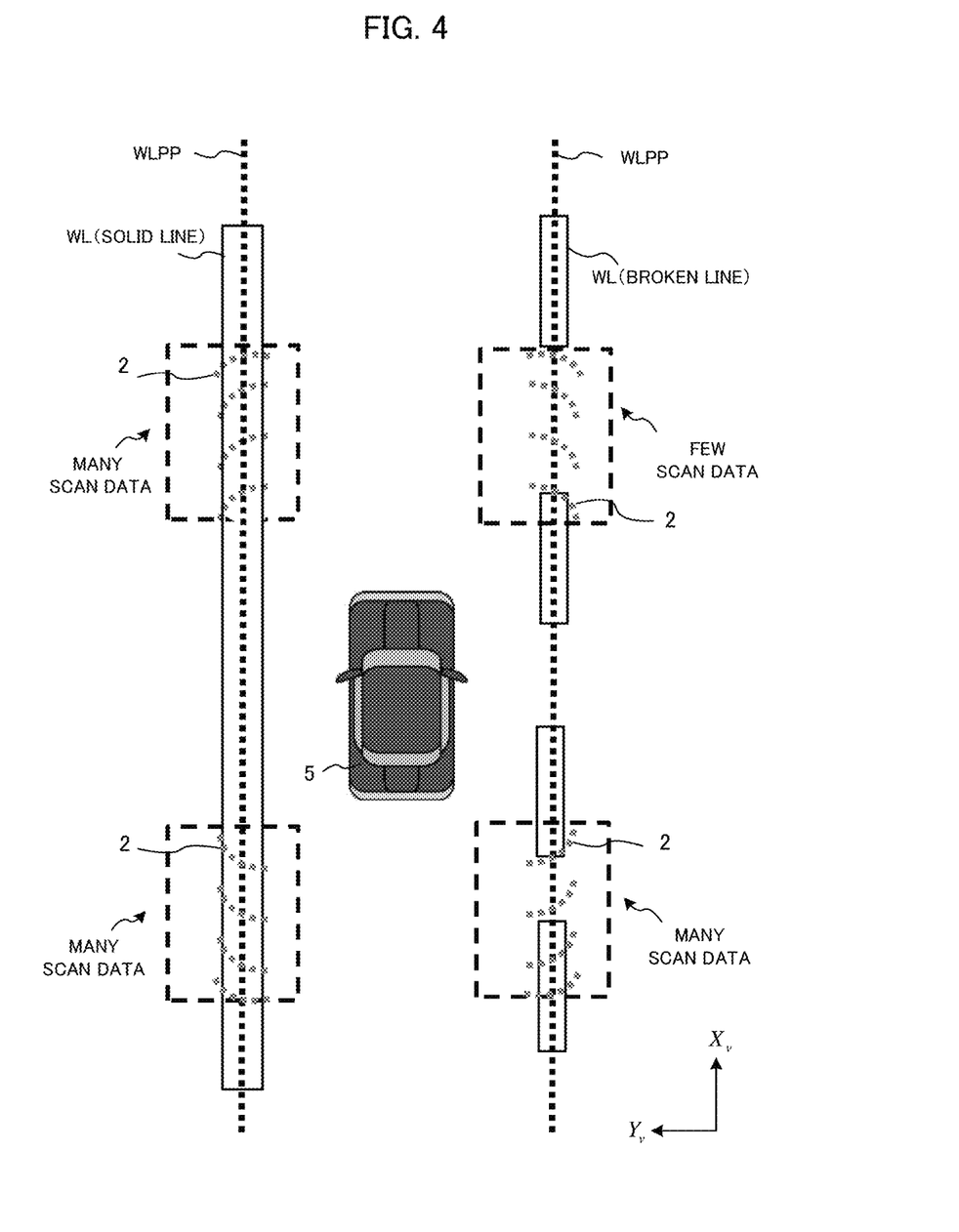
FIG. 4 is a diagram explaining an extraction method of the white line scan data.

As described above, in the cases where the white line WL is the solid line and the broken line, the white line center position is calculated by the same method. However, when the white line WL is the broken line, the number of the white line scan data WLSD existing in the white line predicted range WLPR becomes small dependently upon the positional relation between the white line WL and the white line predicted range WLPR. FIG. 4 illustrates an example of the positional relation between the white lines WL and the white line predicted ranges WLPR when the white lines WL are the solid line and the broken line. As shown in FIG. 4, when the white line WL is the solid line, the white line predicted range WLPR basically includes the white line in its whole area in the $X_v$-axis direction at any timing, and therefore the number of acquired white line scan data WLSD is large. In contrast, when the white line WL is the broken line, the number of the white line scan data WLSD acquired in the white line predicted range WLPR becomes small if the white line predicted range WLPR is positioned at the space section of the white line WL. When the number of the white line scan data WLSD used to calculate the white line center position is small, the accuracy of the calculated white line center positions WLCP becomes low.

Also, even when the white line WL is the solid line, if the white line paint on the road surface is damaged or faded by abrasion, the LiDAR cannot acquire the scan data of high reflection intensity. In this case, the number of the white line scan data WLSD in the white line predicted range WLPR decreases, and the accuracy of the white line center positions becomes low.

In the above view, in this embodiment, although the white line center positions WLCP are calculated by the same method when the number of the white line scan data WLSD is large and small, reliability R indicating the calculation accuracy of the white line center positions WLCP is additionally calculated based on the number of the white line scan data WLSD. Basically, the reliability R becomes higher as the number of the white line scan data WLSD existing in the white line predicted range WLPR is larger, and the reliability R becomes lower as the number of the white line scan data WLSD existing in the white line predicted range WLPR is smaller. Instead of the number of the white line scan data, the reliability R may be calculated based on the number of scan lines or layers by the LiDAR. In this case, the reliability R becomes higher as the number of the scan lines or the layers becomes larger, and the reliability R becomes lower as the number becomes smaller. The scan data corresponds to "points indicating feature" or "point group" of the present invention, and the scan line or the layer corresponds to "a set of points".

In a preferred example, the reliability R is calculated by the following equation.

$$R = \frac{n}{N} \quad (5)$$

N: Ideal number of white line scan data

Here, "n" is a number of the white line scan data existing in the white line predicted range WLPR, and "N" is an ideal number of the white line scan data existing in the white line predicted range WLPR. The ideal number N of the white line scan data is calculated based on the size of the white line predicted range WLPR and the width of the white line WL. Specifically, first the area S occupied by the white line when the white line exists in the whole area of the white line predicted range WLPR in the $X_v$-axis direction is calculated based on the size of the white line predicted range WLPR and the width of the white line WL. For example, when the white line predicted range WLPR has the length "$2\Delta X$" in the $X_v$-axis direction as shown in FIG. 2B and the width of the white line is "W", the area "S" of the white line is given by:

$$S = 2\Delta X \cdot W$$

Next, the number of the scan data acquired in the area S is calculated based on the scan density by the LiDAR, and the number is used as the ideal number N of the white line scan data.

Namely, the ideal number N of the white line scan data is the number of the scan data in a case where the white line exists in a whole area of the white line predicted range WLPR in the $X_v$-axis direction and the scan data of high reflection intensity are acquired in the whole area of the white line. Then, by the equation (5), the reliability R is given by the ratio of the number n of the white line scan data WLSD actually acquired in the white line predicted range WLPR and the ideal number N of the white line scan data.

In another example, the reliability R is calculated by the following equation.

$$R = \frac{m}{M} \quad (6)$$

M: Ideal number of white line scan lines

Here, "m" is a number of the white line scan lines existing in the white line predicted range WLPR. "White line scan line" is a scan line formed by the white line scan data. "M" is an ideal number of the white line scan lines.

The ideal number M of the white line scan lines is the number of the white line scan lines in a case where the white line exists in a whole area of the white line predicted range WLPR in the $X_v$-axis direction and the scan data of high reflection intensity can be acquired in the whole area of the white line. Then, by the equation (6), the reliability R is given by the ratio of the number m of the white line scan lines actually acquired in the white line predicted range WLPR and the ideal number M of the white line scan lines.

The reliability R thus calculated is outputted in correspondence with the calculation result of the white line center positions WLCP and used for the own vehicle position estimation. For example, in the own vehicle position estimation, when the own vehicle position is estimated based on the white line center position WLCP, weighting is executed based on the reliability R. By this, the white line center position WLCP of low reliability is not used for the own vehicle position estimation or used with low weight. Thus, it is prevented that the own vehicle position estimation of low accuracy is executed based on the white line center positions WLCP of low reliability.

Device Configuration

Figure 5:
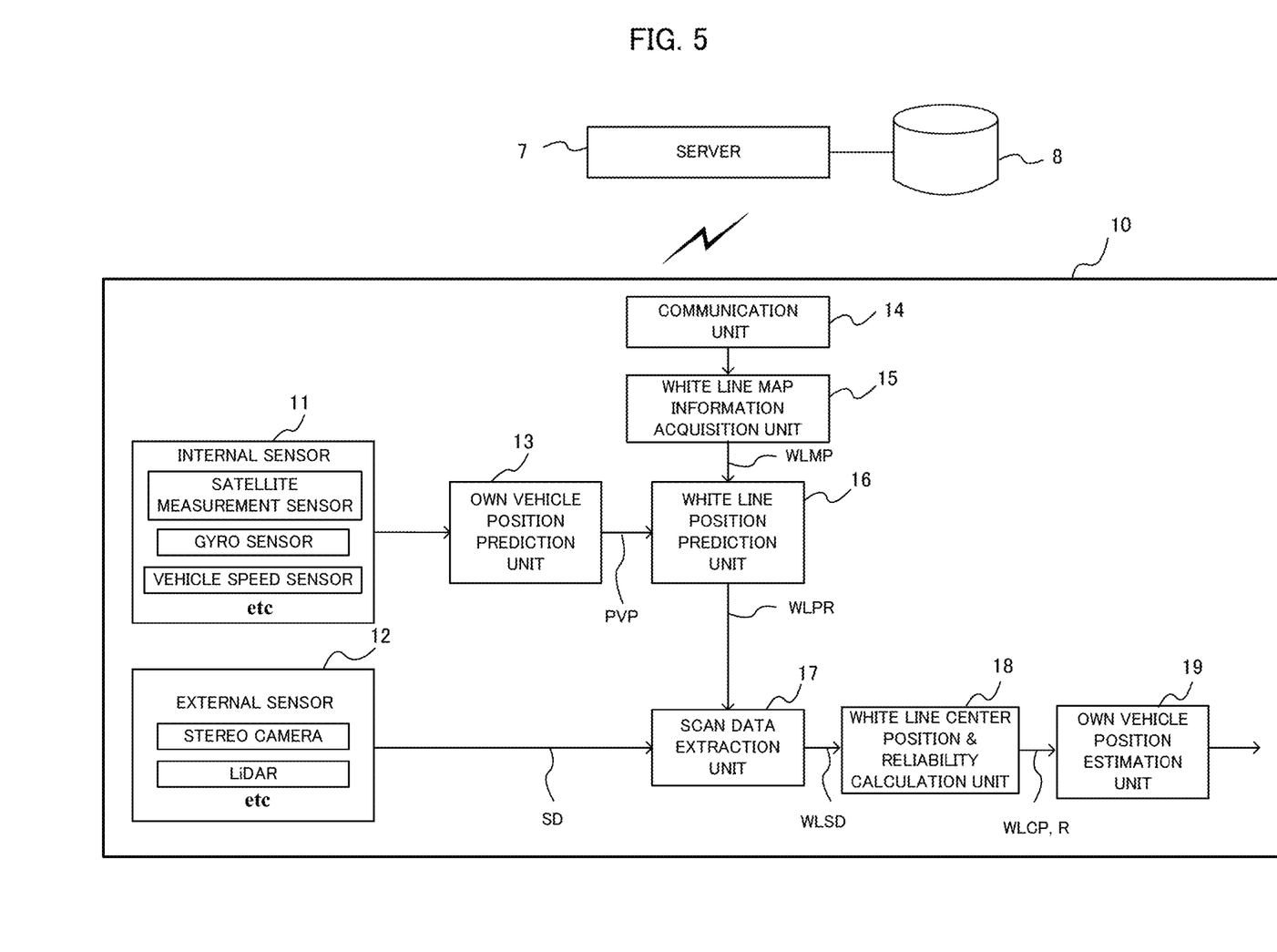
FIG. 5 is a block diagram illustrating a configuration of a measurement device.

FIG. 5 illustrates a schematic configuration of an own vehicle position estimation device to which a measurement device according to the present invention is applied. The own vehicle position estimation device 10 is loaded on a vehicle, and communicable with a server 7 such as a cloud server by wireless communication. The server 7 is connected to a database 8, and the database 8 stores high-density map. The high-density map stored in the database S includes landmark map information for each landmark. As to the white lines, the database 8 stores white line map positions WLMP indicating the coordinates of the point sequence forming the white lines, and width information of the white lines. The own vehicle position estimation device 10 communicates with the server 7, and downloads the white line map information related to the white lines around the position of the vehicle.

The own vehicle position estimation device 10 includes internal sensors 11, external sensors 12, an own vehicle position prediction unit 13, a communication unit 14, a white line map information acquisition unit 15, a white line position prediction unit 16, a scan data extraction unit 17, a white line center position and reliability calculation unit 18 and an own vehicle position estimation unit 19. The own vehicle position prediction unit 13, the white line map information acquisition unit 15, the white line position prediction unit 16, the scan data extraction unit 17, the white line center position and reliability calculation unit 18 and the own vehicle position estimation unit 19 are realized by a computer such as a CPU which executes a program prepared in advance.

The internal sensors 11 measure the own vehicle position of the vehicle as a GNSS (Global Navigation Satellite System)/IMU (Inertia Measurement Unit) composite navigation system, and include a satellite measurement sensor (GPS), a gyro sensor and a vehicle speed sensor. The own vehicle position prediction unit 13 predicts the own vehicle position by the GNSS/IMU composite navigation system based on the outputs of the internal sensors 11, and supplies the predicted own vehicle position PVP to the white line position prediction unit 16.

The external sensors 12 are the sensors for detecting objects around the vehicle, and include a stereo camera and a LiDAR. The external sensors 12 supply the scan data SD acquired by the measurement to the scan data extraction unit 17.

The communication unit 14 is used for wireless communication with the server 7. The white line map information acquisition unit 15 receives the white line map information associated with the white lines existing around the vehicle from the server 7 via the communication unit 14, and supplies the white line map positions WLMP included in the white line map information to the white line position prediction unit 16.

The white line position prediction unit 16 calculates the white line prediction positions WLPP by the aforementioned equation (1) based on the white line map positions WLMP and the predicted own vehicle position PVP acquired from the own vehicle position prediction unit 13. Also, the white line position prediction unit 16 determines the white line prediction ranges WLPR by the aforementioned equations (2) and (3) based on the white line prediction positions WLPP, and supplies them to the scan data extraction unit 17.

Further, the white line position prediction unit 16 supplies the widths W of the white lines included in the white line map information to the white line center position and reliability calculation unit 18.

The scan data extraction unit 17 extracts the white line scan data WLSD based on the white line prediction ranges WLPR supplied from the white line position prediction unit 16 and the scan data SD acquired from the external sensors 12. Specifically, from the scan data SD, the scan data extraction unit 17 extracts the scan data which are included in the white line prediction ranges WLPR, which are on the road, and whose reflection intensity is larger than a predetermined value, as the white line scan data WLSD, and supplies them to the white line center position and reliability calculation unit 18.

The white line center position and reliability calculation unit 18 calculates the white line center positions WLCP from the white line scan data WLSD by the equation (4), as described with reference to FIGS. 3A and 3B. Then, the white line center position and reliability calculation unit 18 supplies the calculated white line center positions WLCP to the own vehicle position estimation unit 19.

The own vehicle position estimation unit 19 estimates the own vehicle position and the own vehicle azimuth angle based on the white line map positions WLMP in the high-density map and the white line center positions WLCP which are the measurement data of the white lines by the external sensor 12. At that time, the own vehicle position estimation unit 19 weights the white line center positions WLCP by the reliability R, and applies them to the estimation of the own vehicle position and the own vehicle azimuth angle. By this, the white line center position WLCP of high reliability R is applied to the estimation of the own vehicle position and the own vehicle azimuth angle with a large rate, and the white line center position WLCP of low reliability R is hardly reflected to the estimation of the own vehicle position and the own vehicle azimuth angle. Thus, it becomes possible to prevent deterioration of the estimation accuracy of the own vehicle position and the own vehicle azimuth angle. Japanese patent application laid-open under No 2017-72422 discloses an example of a method for estimating an own vehicle position by matching the landmark position information in the high-density map and the measured position information of the landmark by external sensors.

In the above configuration, the white line map information acquisition unit 15 is an example of a first acquisition unit of the present invention, the scan data extraction unit 17 is an example of a second acquisition unit of the present invention, the white line center position and reliability calculation unit 18 is an example of an output unit of the present invention, and the white line prediction unit 16 is an example of a range determination unit of the present invention.

Own Vehicle Position Estimation Processing

Figure 6:
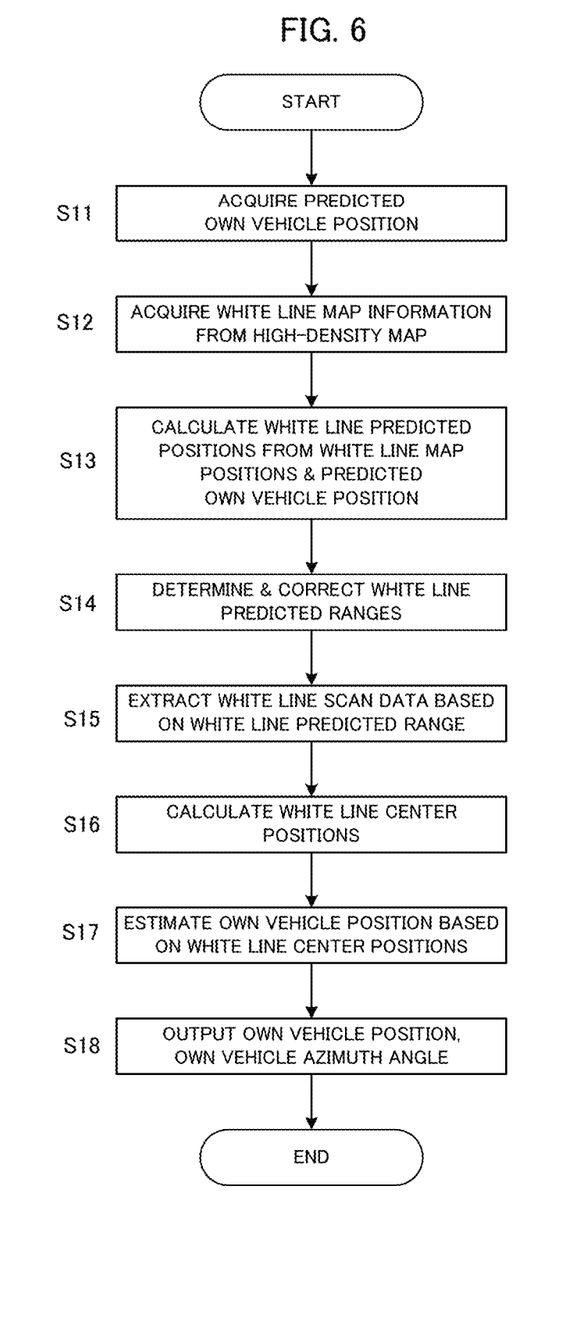
FIG. 6 is a flowchart of an own vehicle position estimation processing using white lines.

Next, the own vehicle position estimation processing by the own vehicle position estimation device 10 will be described. FIG. 6 is a flowchart of the own vehicle position estimation processing. This processing is realized by a computer such as a CPU which executes a program prepared in advance to function as the components shown in FIG. 5.

First, the own vehicle position prediction unit 13 acquires the predicted own vehicle position PVP based on the outputs from the internal sensors 11 (step S11). Next, the white line map information acquisition unit 15 connects to the server 7 via the communication unit 14, and acquires the white line map information from the high-density map stored in the database 8 (step S12). It is noted that step S11 and S12 may be exchanged.

Next, the white line position prediction unit 16 calculates the white line prediction positions WLPP based on the white line map positions WLMP included in the white line position information acquired in step S12 and the predicted own vehicle position PVP acquired in step S11 (step S13). Also, the white line position prediction unit 16 determines the white line predicted ranges WLPR based on the white line predicted positions WLPP, and supplies them to the scan data extraction unit 17 (step S14).

Next, from the scan data SD acquired from the LiDAR serving as the external sensor 12, the scan data extraction unit 17 extracts the scan data which are included in the white line prediction ranges WLPR, which are on the road, and whose reflection intensity is larger than the predetermined value, as the white line scan data WLSD, and supplies them to the white line center position and reliability calculation unit 18 (step S15).

Next, the white line center position and reliability calculation unit 18 calculates the white line center positions WLCP and the reliabilities R based on the white line prediction ranges WLPR and the white line scan data WLSD, and supplies them to the own vehicle position estimation unit 19 (step S16). Then, the own vehicle position estimation unit 19 executes own vehicle position estimation using the white line center positions WLCP and the reliabilities R (step S17), and outputs the own vehicle position and the own vehicle azimuth angle (step S18). Then, the own vehicle position estimation processing ends.

Modified Example

While the above embodiment uses the white lines which are the lane boundaries indicating the lanes, the application of the present invention is not limited to this example, and linear road signs such as pedestrian crossings and stop lines may be used. Also, instead of white lines, yellow lines may be used. The lane dividing lines such as white and yellow lines and the road signs mentioned above are examples of road surface lines according to the present invention.

BRIEF DESCRIPTION OF REFERENCE NUMBERS

5 Vehicle
7 Server
8 Database
10 Own vehicle position estimation device
11 Internal sensor
12 External sensor
13 Own vehicle position prediction unit
14 Communication unit
15 White line map information acquisition unit
16 White line position prediction unit
17 Scan data extraction unit
18 White line center position calculation unit
19 Own vehicle position estimation unit

The invention claimed is:
1. A measurement device comprising:
a processor coupled to a memory storing instructions, the processor being configured to:
acquire positional information of a measurement object stored in a storage unit;

acquire point group information of points indicating a surrounding feature acquired by an external sensor;

output reliability of the positional information of the measurement object indicating a center position of the measurement object existing in a predetermined range based on the point group information of points existing in the predetermined range, the predetermined range being determined based on a position of a movable body; and estimate an own vehicle position based on the positional information of the measurement object and the center position of the measurement object, wherein the processor estimates the own vehicle position based on the center position weighted by the reliability, and wherein the reliability of the positional information is utilized to prevent deterioration of accuracy in estimating the position of the movable body.

2. The measurement device according to claim 1, wherein the processor sets the reliability higher as a number of the points or a number of sets of the points existing in the predetermined range is larger.

3. The measurement device according to claim 1, wherein the measurement object is painted on a road.

4. The measurement device according to claim 3, wherein the measurement object is a road surface line, and wherein the processor calculates an ideal number of points, which is a number of the points on an ideal road surface line, based on a width information of the road surface line, and determines the reliability based on a ratio of the number of the points existing in the predetermined range to the ideal number of the points.

5. The measurement device according to claim 4, wherein the processor sets the reliability higher as the ratio of the number of the points existing in the predetermined range to the ideal number of the points is larger.

6. The measurement device according to claim 1, wherein the processor is further configured to calculate a predicted position of the measurement object based on the positional information of the measurement object and a position of the measurement device, and determine the predetermined range based on the predicted position.

7. The measurement device according to claim 1, wherein the processor outputs the positional information indicating the center position of the measurement object.

8. A measurement method executed by a measurement device, the measurement method comprising:

a first acquisition process configured to acquire positional information of a measurement object stored in a storage unit;

a second acquisition process configured to acquire point group information of points indicating a surrounding feature acquired by an external sensor;

an output process configured to output reliability of the positional information of the measurement object indicating a center position of the measurement object existing in a predetermined range based on the point group information of points existing in the predetermined range, the predetermined range being determined based on a position of a movable body; and an estimation process configured to estimate an own vehicle position based on the positional information of the measurement object and the center position of the measurement object, wherein the estimation of the own vehicle position is based on the center position weighted by the reliability, and wherein the reliability of the positional information is utilized to prevent deterioration of accuracy in estimating the position of the movable body.

9. A non-transitory computer-readable medium storing a program executed by a measurement device by a processor of a computer, the program causing the processor of the computer to:

acquire positional information of a measurement object stored in a storage unit;

acquire point group information of points indicating a surrounding feature acquired by an external sensor;

output reliability of the positional information of the measurement object indicating a center position of the measurement object existing in a predetermined range based on the point group information of points existing in the predetermined range, the predetermined range being determined based on a position of a movable body; and estimate an own vehicle position based on the positional information of the measurement object and the center position of the measurement object, wherein the processor estimates the own vehicle position based on the center position weighted by the reliability, and wherein the reliability of the positional information is utilized to prevent deterioration of accuracy in estimating the position of the movable body.

\* \* \* \* \*